No. 613,888. Patented Nov. 8, 1898.
S. H. SCHMUCK.
CAN.
(Application filed June 22, 1898.)
(No Model.) 2 Sheets—Sheet 1.

Witnesses,

Inventor,
Solomon H. Schmuck,
per Geo. W. Tibbitts, Attorney.

No. 613,888. Patented Nov. 8, 1898.
S. H. SCHMUCK.
CAN.
(Application filed June 22, 1898.)
(No Model.) 2 Sheets—Sheet 2.

Witnesses.
Lewis W. Ford
E. R. Heymann

Inventor,
Solomon H. Schmuck
per Geo. W. Tibbitts, Attorney.

UNITED STATES PATENT OFFICE.

SOLOMON H. SCHMUCK, OF CLEVELAND, OHIO.

CAN.

SPECIFICATION forming part of Letters Patent No. 613,888, dated November 8, 1898.

Application filed June 22, 1898. Serial No. 684,197. (No model.)

*To all whom it may concern:*

Be it known that I, SOLOMON H. SCHMUCK, a citizen of the United States of America, and a resident of Cleveland, county of Cuyahoga, and State of Ohio, have invented certain new and useful Improvements in Cans, of which the following is a specification.

This invention relates to cans, and particularly to that class known as "garbage" or "ash" cans; and it consists in the new and peculiar construction and combination of the bail and cover as applied to the can, substantially as hereinafter described, and pointed out in the claims.

Figure 1:
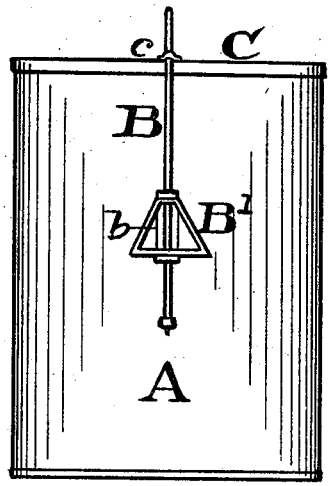
Figure 2:
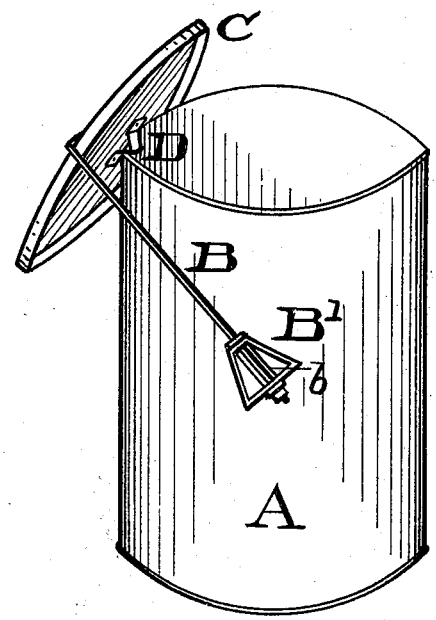
Figure 3:
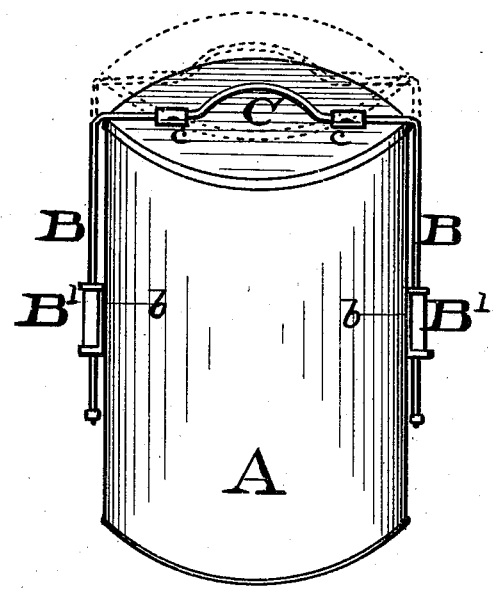
Figures 4, 5:
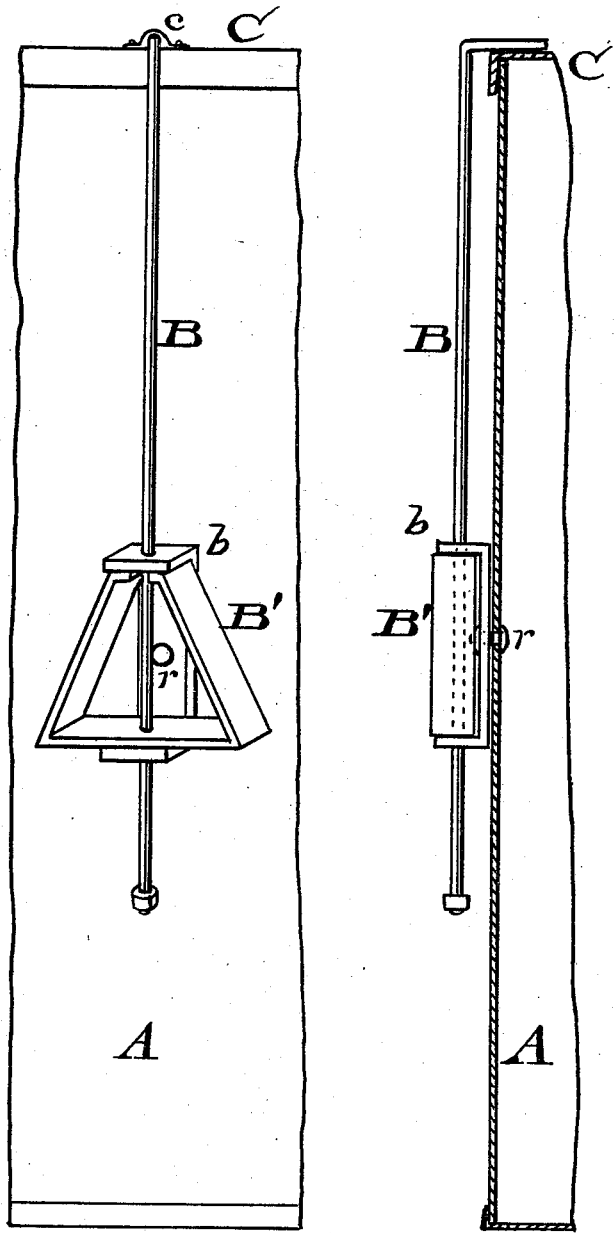

In the accompanying drawings, Figure 1 is a side elevation of a can, showing the manner of constructing and applying my improvement. Fig. 2 is a perspective view of the can, showing the cover tilted for uncovering the can. Fig. 3 is a front side perspective view showing the can closed and the arrangement of the bail as applied to the can and cover. Fig. 4 is an enlarged perspective view of the method of attaching the bail to the can. Fig. 5 is an edge view of the same, showing a portion of the can in section and the pivotal rivet which connects the bail-ear to the can.

A represents a can of the usual form and construction for use as an ash, garbage, or waste can.

B is a bail composed of a rod of iron, formed to extend down two sides and across the top of the can. The ends of the bail are attached to the sides of the can by means of a peculiar construction, as follows: *b* is a piece of strap-iron having its ends bent outward and pierced with holes, through which the ends of the bail are passed. Said pieces *b* are attached to the sides of the can, at about their central part, by rivets, upon which they may turn. The ends of the bail have nuts or heads on them, forming stops to prevent the withdrawal of the bail from said pieces *b*.

B' are triangular handles formed of a piece of strap-iron bent in the form as shown in Figs. 1 and 2. These pieces have holes and are put onto the bail and between the ends of the pieces *b*, the bail passing through the holes, so that the bail may slide through them alike with the pieces *b*.

C is a cover attached to the cross part of the bail by the clips *c c* or other suitable means, and the middle part of the bail is bent upward to form a handle.

D is a stop-piece attached to the center of the under side of the cover to hold the cover substantially in the position seen in Fig. 2 when the can is opened.

The can may also be emptied by lifting it by the handles B', and then without removing the hands therefrom the cover may be turned away from the mouth of the can by turning the handles, and thus affording unobstructed passage of the contents.

The advantages derived from this improvement are that the cover cannot be entirely removed from the can and become lost or misplaced, that the cover is readily turned off for filling or emptying the can and the cover is quickly replaced for again covering the can, and the can may be conveniently lifted and carried by the handles B'.

I do not wish to be confined to the exact construction and manner of application of the bail to the can and cover, as it is obvious that there are modifications or equivalent forms for the arrangement of the bail for the purpose.

Having described my invention, what I claim is—

1. The combination of can A, cover C, bail B pivotally attached to the cover extending thereover and forming a handle, ears *b b* pivoted onto the sides of the can, and having their ends bent and pierced, the bail slidably supported in the said pierced ends of the ears, and stops on the ends of the bail, constructed to operate substantially as set forth.

2. The combination of a can A, cover C, bail B permanently attached to the cover, ears *b b* pivoted onto the sides of the can, and having their ends bent and pierced, the bail loosely supported in the said pierced ends of the ears, and stops on the ends of the bail, and the handles B' supported on the bail between the bent ends of the ears, constructed to operate substantially as set forth.

3. The combination of a can, a cover, and a bail, the bail having arms pivotally and slidably attached to the sides of the can, and a cross-piece to which the cover is pivotally attached, bent away from the cover at its center to form a handle.

4. The combination with a can, of ears pivoted to its sides, a bail slidable in said ears, and held to turn therewith, a cover attached to said bail, and handles on said ears by means of which the can may be lifted and the cover turned therefrom when the can is inverted.

Signed by me this 18th day of June, 1898.

SOLOMON H. SCHMUCK.

Witnesses:
GEO. W. TIBBITTS,
MAX P. GOODMAN.